United States Patent [19]
Gorecki et al.

[11] Patent Number: 5,499,708
[45] Date of Patent: Mar. 19, 1996

[54] ELONGATE MEMBER ORIENTING RAMP

[75] Inventors: Michael J. Gorecki, Cromwell; Roger S. Mastrony, New Haven, both of Conn.

[73] Assignee: United States Surgical Corporation, Norwalk, Conn.

[21] Appl. No.: 263,981

[22] Filed: Jun. 22, 1994

[51] Int. Cl.$^6$ ................................................ B65G 47/24
[52] U.S. Cl. ............................................................ 198/400
[58] Field of Search ............................. 198/400, 391, 198/395, 771, 463.6; 193/44

[56] References Cited

U.S. PATENT DOCUMENTS

| | | | |
|---|---|---|---|
| 2,385,618 | 9/1945 | Ekstrand | 198/400 |
| 3,115,235 | 12/1963 | Othon | 198/395 |
| 3,207,287 | 9/1965 | Ponsen | 198/463.6 |
| 3,268,057 | 8/1966 | Ross et al. | 198/400 |
| 3,295,661 | 1/1962 | Mitchell et al. | 198/391 |
| 3,301,379 | 1/1967 | Moore | 198/391 |
| 3,605,983 | 9/1971 | Oldershaw | 198/400 |
| 3,636,486 | 1/1972 | Ioffe et al. | 198/400 |
| 4,172,513 | 10/1979 | Bradstreet et al. | |
| 4,436,479 | 3/1984 | Belloli | |
| 4,602,711 | 7/1986 | Wullenwaber | 198/771 |
| 4,623,293 | 11/1986 | Brown et al. | |

FOREIGN PATENT DOCUMENTS

| | | | |
|---|---|---|---|
| 183662 | 5/1963 | Sweden | 198/400 |

*Primary Examiner*—Joseph E. Valenza

[57] ABSTRACT

The present invention relates to an apparatus and method for orienting elongate members and, in particular tapered needle blanks. Generally, the apparatus includes a needle feeding assembly which receives needle blanks at an inlet and sequentially transfers the needle blanks to a needle orienting ramp which orients the needle blanks in a barrel end downward configuration. A barrel end of the needle blank, being heavier and having a greater diameter than that of a tapered point of the needle blank, moves down the rampway such that the barrel end of the needle blank advances ahead of a tapered point of the needle blank causing the needle blank to assume a barrel end downward or toward orientation on the rampway. A collecting assembly is provided at an outlet end of the needle orienting ramp to collect and maintain the needle blanks in oriented fashion. In one embodiment, the needle blanks are encouraged to move along the rampway by elevating an inlet end of the rampway with respect to an outlet end of the rampway. The needle blanks may be suspended on the rampway by needle end supporting surfaces or low or essentially frictionless surfaces. The apparatus according to the present invention may additionally include structure for sequentially supplying a plurality of needle blanks to the inlet end of the rampway and structure for collecting and maintaining the oriented tapered needle blanks.

15 Claims, 4 Drawing Sheets

5,499,708

ELONGATE MEMBER ORIENTING RAMP

BACKGROUND OF THE INVENTION

1. Field of the Invention

The present invention relates to an elongate member orienting machine. More particularly, the present invention relates to an elongate member orienting machine which orients elongate members according to their end portion characteristics.

2. Description of the Related Art

The production of needles involves many processes and different types of machinery in order to prepare quality needles from raw stock. These varying processes and machinery become more critical in the preparation of needles for use in humans or animals. Some of the processes involved in the production of surgical grade needles include, inter alia: straightening spooled wire stock; cutting needle blanks from the wire stock; providing a bore for receiving suture thread at one end of the blank; tapering or grinding points on the other end of the blank; flat pressing a portion of the needle barrel to facilitate easier grasping by surgical instrumentation; and curving the blanks where curved surgical needles are desired. Conventional needle processing is, in large part, a labor intensive operation requiring highly skilled labor wherein extreme care must be taken to ensure that only the intended working of the needle is performed and the other parts of the needle remain undisturbed.

Additionally, in order to speed up production and enhance cost efficiency, it is desirable to process the needle blanks in large lots or batches. Automated machinery has been developed to perform a single operation, or even multiple operations, on a plurality of needle blanks. Such operations may include, for example, grinding, pressing, curving, etc.

During many of the automated processes, it is preferable to have all the needle blanks in a batch organized in the same orientation, such as, for example parallel and with tapered ends pointing in the same direction. Currently, needle blanks collected in random arrangement are generally sorted or oriented by hand according to their end face character.

Thus, there exists a need for a highly cost efficient apparatus and method for orienting needle blanks so that corresponding end faces of the blanks are oriented in the same direction after one end of the blank has been ground to form a taper.

SUMMARY OF THE INVENTION

The present invention relates to an apparatus and method for orienting an elongate member having a first end with a diameter greater than the diameter of a second end. The apparatus of the present invention includes an orienting rampway having an arcuate cross-section with an inlet end at a higher elevation than an outlet end. The apparatus also includes releasing structure positioned at the inlet end of the rampway for releasing the elongate member onto the rampway such that a longitudinal axis of the elongate member is substantially perpendicular to a longitudinal axis of the rampway. The arcuate cross-section causes the straight elongate member to bridge the arc of the rampway and roll on its ends with the center portion of the elongate member suspended over the rampway. The rolling of the elongate member causes the larger diameter end to get ahead of the smaller diameter end at any given rotational speed. Preferably, the inlet end of the rampway has a greater radius than the outlet end of the rampway. The apparatus further includes a friction enhancing surface on at least a portion of the inlet end of the rampway to encourage rolling of the elongate member. The inlet end may also be provided with a surface material suitable to cushion the impact of elongate members released onto the rampway by the releasing structure. The outlet section of the rampway has a surface that allows the oriented elongate members to slide axially down the ramp without rolling while maintaining their orientation.

In a preferred embodiment of the invention, the releasing structure includes a feeder block for positioning the longitudinal axis of the elongate member substantially perpendicular to the longitudinal axis of the rampway and discharging the elongate member onto the rampway. The feeder block includes structure to discharge an elongate member onto the rampway. Preferably the feeder block sequentially discharges elongate members onto the rampway one at a time. Additionally, a vibrator device may be attached to the feeder block to aid the flow of elongate members therethrough.

The needle blank orienting apparatus may further include apparatus for supplying a substantially continuous supply of elongate members to the feeder block. In a preferred embodiment, a vibratory bowl is provided for holding a supply of elongate members and supplying a steady stream of elongate members to the feeder block. A collecting apparatus may be provided at the outlet end of the rampway for collecting the oriented elongate members from the rampway. Preferably, the collecting apparatus includes a container for holding and maintaining the elongate members in a desired orientation, and a funneling device at the outlet end of the rampway for transferring a single oriented elongate member at a time from the rampway to the container. The container may be a removable cascade cartridge.

In an alternate embodiment of the present invention the apparatus includes an elongate member orienting rampway having a pair of spaced apart longitudinally extending elongate member end supporting surfaces. Structure may be provided at an inlet end of the rampway for depositing a larger diameter end of the elongate member and a narrower diameter end of the elongate member onto the end supporting surfaces. The apparatus also includes structure for moving the elongate member from the inlet end of the rampway towards an outlet end of the rampway, wherein the larger end of the elongate member moves ahead of the narrower end of the elongate member to orient the elongate member in a larger end forward position on the rampway.

Preferably, a friction enhancing surface is provided on the end supporting surfaces to encourage the elongate member to roll on the rampway. A tray may be positioned between the end supporting surfaces such that the tray collects and maintains the oriented elongate member as it falls between end supporting surfaces.

The present invention also relates to a method of orienting an elongate member having a barrel end and a tapered end. The method includes providing a rampway having an arcuate cross-section, the rampway having an inlet end at a higher elevation than an outlet end of the rampway; and releasing the elongate member onto the inlet end of the rampway such that a longitudinal axis of the elongate member is substantially perpendicular to a longitudinal axis of the rampway, wherein the barrel end of the elongate member, being of a larger diameter than the tapered point end, moves ahead of the tapered point end to orient the elongate member in a barrel end downward configuration on the rampway.

The method may additionally include the step of collecting the barrel end down elongate member in a container positioned at the outlet end of the rampway. The collecting step preferably includes transferring the barrel end down elongate member from the rampway to the container and maintaining the barrel end down orientation during the transferring step.

BRIEF DESCRIPTION OF THE DRAWINGS

For a further understanding of the present invention, reference is made to the following detailed description of the preferred embodiments which is to be taken in connection with the accompanying drawings, wherein.

DETAILED DESCRIPTION OF THE PREFERRED EMBODIMENTS

The present invention relates to an apparatus for orienting elongate members having a first end portion heavier or of a larger diameter than a second end portion. While the present invention is capable of orienting various types of elongate members, it is particularly suited to orient, and will be described hereinafter in terms of, elongate members such as surgical needle in various stages of completion and which have been formed with a taper on one end thereof.

Figure 1:
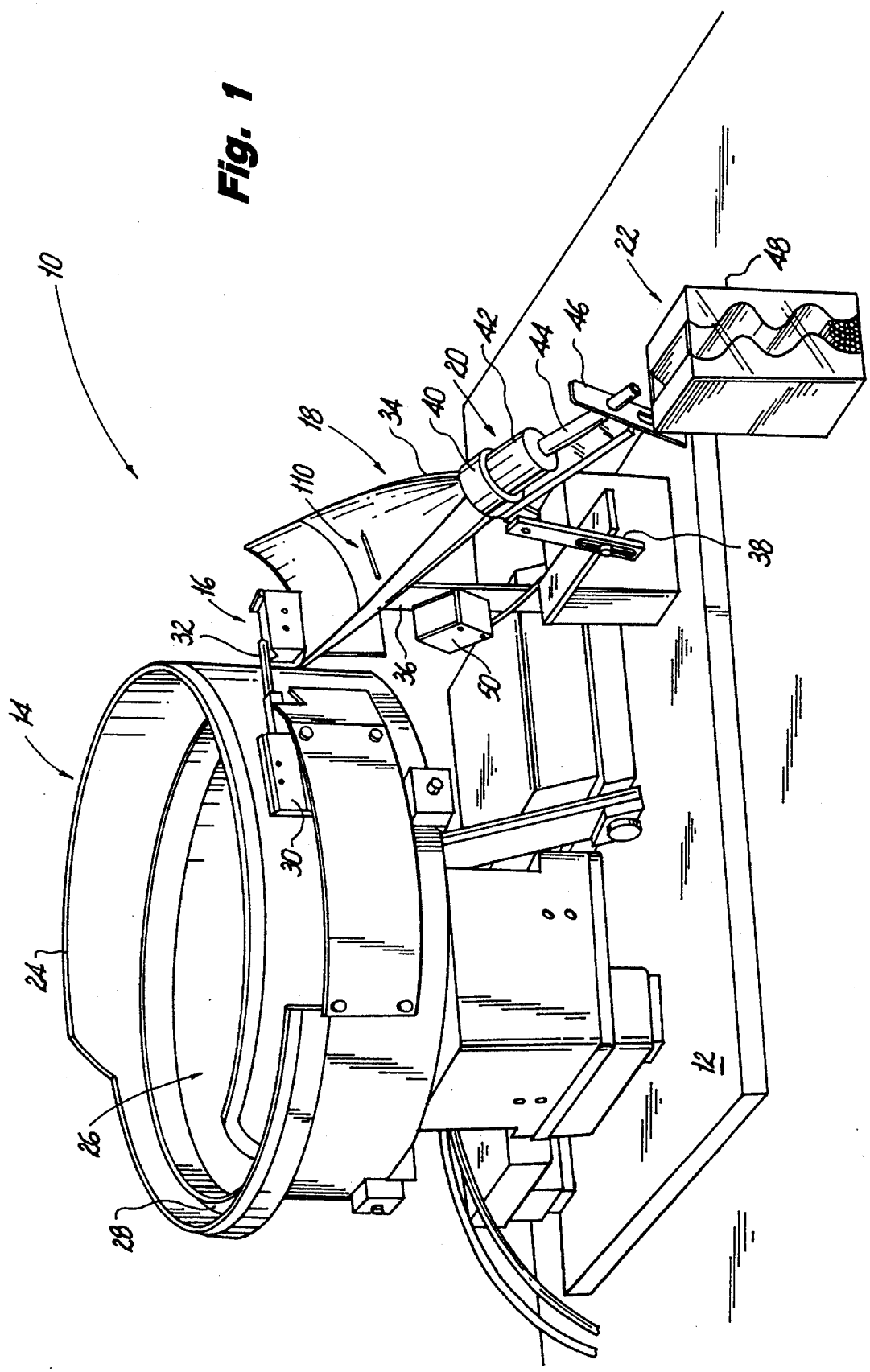
FIG. 1 is an overall perspective view of the elongate member needle orienting apparatus in accordance with a preferred embodiment of the present invention.
Figure 2:
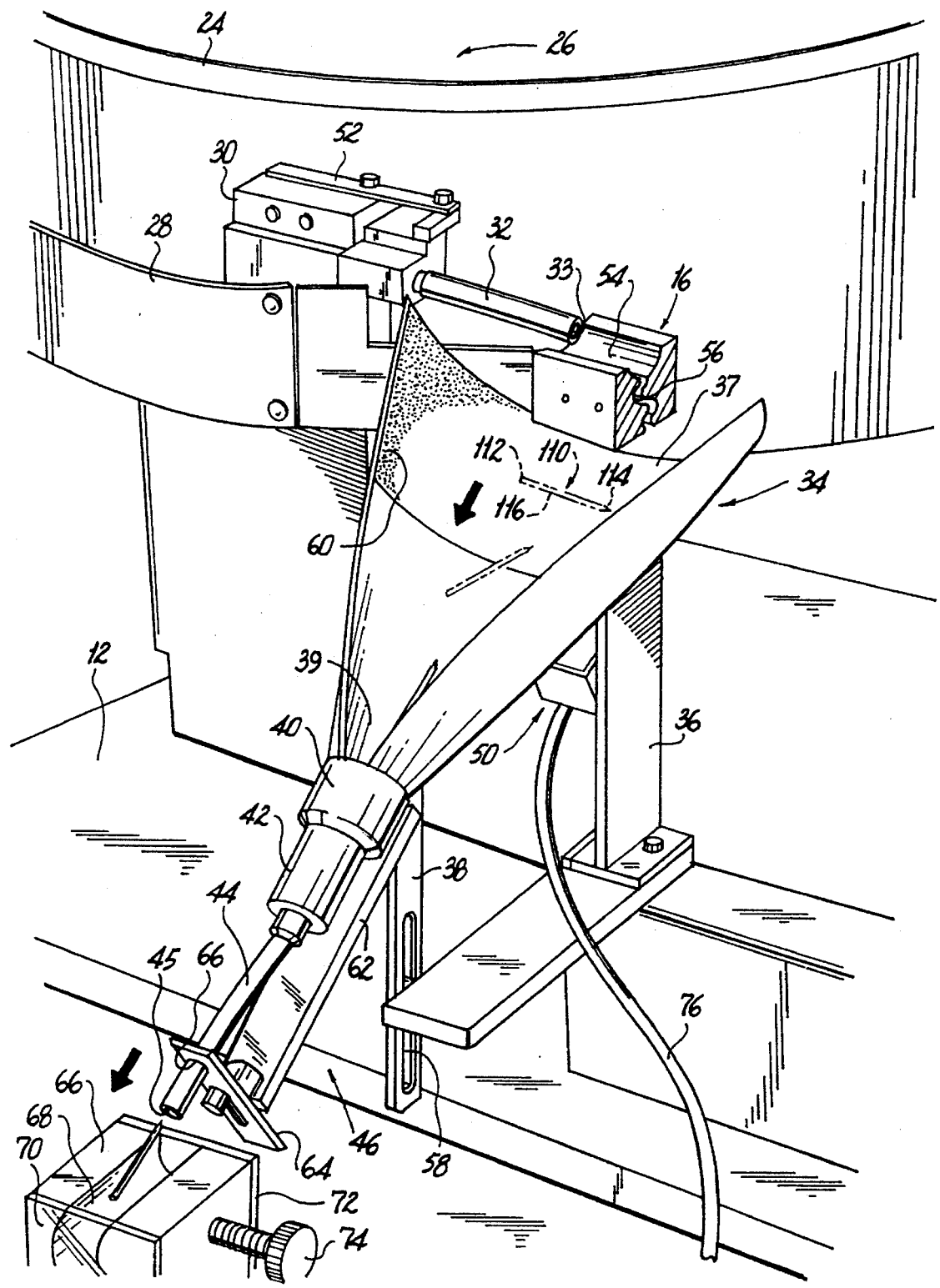
FIG. 2 is an enlarged perspective view of the elongate member orienting apparatus of the present invention illustrating an elongate member being oriented larger end downward as it moves along the rampway.

Referring now to FIGS. 1–6, wherein like pans have been given like index numerals and initially to FIGS. 1 and 2, there is shown a needle orienting apparatus in accordance with a preferred embodiment of the present invention. As shown in FIG. 1, needle blank orienting apparatus 10 generally includes a base 12, a needle blank supply assembly 14 mounted on base 12, a feeder block 16 and a ramp assembly 18 also mounted on base 12. Needle blank orienting apparatus 10 also includes a needle blank transferring assembly 20 which accepts an oriented needle blank from ramp assembly 18 and transfers it, in oriented fashion, to a collection assembly 22. The needle blank orienting apparatus 10 is particularly suited to orienting tapered needle blanks having overall lengths of approximately 1 to 3 inches and outer barrel end diameters of approximately 0.01 to 0.10 inches, and more preferably about 0.02 to 0.06 inches.

Needle blank supply assembly 14 is provided to retain a quantity of randomly oriented needle blanks and transfer the needle blanks, one at a time, to feeder block 16 for presentation to ramp assembly 18. Preferably, needle blank supply assembly 14 includes a vibratory bowl 24 which is particularly suited to contain a supply of randomly oriented needle blanks in a base 26 of bowl 24. Vibratory bowl 24 further includes a channel 28 which extends in a spiral-like fashion from base 26 to an adjusting block 30. Adjusting block 30 is provided with a feed tube 32 to guide needle blanks into feeder block 16.

Feeder block 16 is dimensioned and configured to receive a randomly oriented tapered needle blank, i.e. either tapered point or barrel end forward, from feed tube 32 and release or deposit the needle blank onto ramp assembly 18. The needle blanks are preferably deposited on ramp assembly 18 such that a longitudinal axis of the needle blank is approximately perpendicular to the longitudinal axis of ramp assembly 18. The needle blanks may also be released on ramp assembly in random orientation. As described hereinbelow, needle blanks which are released onto ramp assembly 18 will consistently move, i.e., slide or roll, down ramp assembly 18 such that a larger diameter end, the barrel end, of the tapered needle blank will always exit ramp assembly 18 with the larger diameter end first.

Ramp assembly 18 preferably includes an arcuate funnel or rampway 34 which is supported on base 12 by a back support 36 and a front support 38. Rampway 34 may be substantially flat. Front support 38 is preferably connected to rampway 34 by means of a collar 40 and is vertically adjustable with respect to base 12. In order to ensure a smooth flow of needle blanks through feeder block 16, a vibrator motor 50 is affixed to back support 36 to gently shake feeder block 16. A power cord 76 is provided to control vibrator 50.

As noted hereinabove, needle blanks which move down rampway 34 exit rampway 34 in oriented fashion, barrel end first, and are collected in a collection assembly 22. Needle blank transfer assembly 20 is preferably provided to move the oriented needle blanks between rampway 34 and collection assembly 22 such that the needle blanks retain their barrel end forward orientation. Preferably, needle blank transferring assembly 20 includes a funnel 42 fixed to rampway 34 by means of collar 40 and a transfer tube 44 extending from funnel 42. A transfer tube support 46 is provided to adjust the position of the transfer tube 44 relative to collection assembly 22.

Referring now to FIG. 2, feed tube 32 discharges a tapered needle blank through an outlet 33 of feed tube 32 and into feeder block 16. Adjusting block 30 of vibratory bowl 24 is provided with an adjusting bar 52 which can be used to adjust the width of channel 28 near the entrance to feeder block 16 so that a single file line of needles enters feeder block 16.

It is noted hereinabove that feeder block 16 is preferably provided to release a needle blank onto rampway 34 such that the longitudinal axis of the needle blank is perpendicular to a longitudinal axis or fall line of rampway 34. To accomplish this, feeder block 16 includes a trough 54 to catch needle blanks ejected from outlet 33 and guide them into a sinusoidal channel 56 in feeder block 16. In this manner, feeder block 16 releases a needle blank at an inlet end 37 of rampway 34. Structure to move the needle blanks down rampway 34 is provided in the form of a front support 38 which is preferably adjustable in the vertical direction by means of a slot 58 formed within front support 38. This adjustability allows an outlet end 39 of rampway 34 to be adjusted in elevation relative to inlet end 37 thereby enabling a needle blank to fast roll then slide along the length of rampway 34.

While rampway 34 is preferably provided with a greater arcuate radius at inlet end 37 relative to the arcuate radius of outlet end 39, a consistent arcuate radius along the length of rampway 34 will still allow a needle blank to move such that the barrel end exits rampway 34 ahead of the tapered end. Further, rampway 34 may be constructed of any suitable material such as, for example, aluminum or stainless steel.

Preferably, a portion of inlet end 37 is provided with a friction enhancing surface, such as a texturized or rubberized coating 60 to ensure that a deposited needle blank rolls along the inlet end 37 of rampway 34 to aid in encouraging the barrel end to move ahead of the tapered point. The coating 60 may also cushion the fall of the needle blank from feeder block 16.

As the needles exit outlet end 39 of rampway 34 the velocity of the needles may be too great to allow the needles be deposited into collection assembly 22 without bouncing and losing orientation. Adjusting structure for compensating for this velocity are provided in the form of tube support 46 which includes a tube support base 62 attached to collar 40 and an adjustable bar 64 having an aperture 65 which is mounted substantially perpendicular to tube support base 62. Transfer tube 44 extends through aperture 65. This achieves an adjustable angle of slope on transfer tube 44 which allows for the deceleration of the needles in this tube as they approach collection assembly 22. Additionally, collection assembly 22 may be raised or lowered to align with transfer tube 44.

Preferably, collection assembly 22 consists of a cascade cartridge 48 of the type described in copending, commonly assigned U.S. patent application Ser. No. 08/133,564, entitled APPARATUS AND METHOD FOR GRINDING NEEDLE WORKPIECES, the disclosure of which is incorporated by reference herein. While collection assembly 22 is described as including cascade cartridge 48, it is within the contemplated scope of the present invention to utilize any form of container which is capable of maintaining a plurality of needle blanks in oriented fashion.

Cascade cartridge 48 includes a cartridge body 66 having a sinusoidal channel 68 therethrough. Transparent front plate 70 and back plate 72 are provided to maintain the oriented needle within sinusoidal channel 68. Further, a stop knob 74 is provided to prevent the flow of additional needle blanks into cascade cartridge 48.

Figure 4:
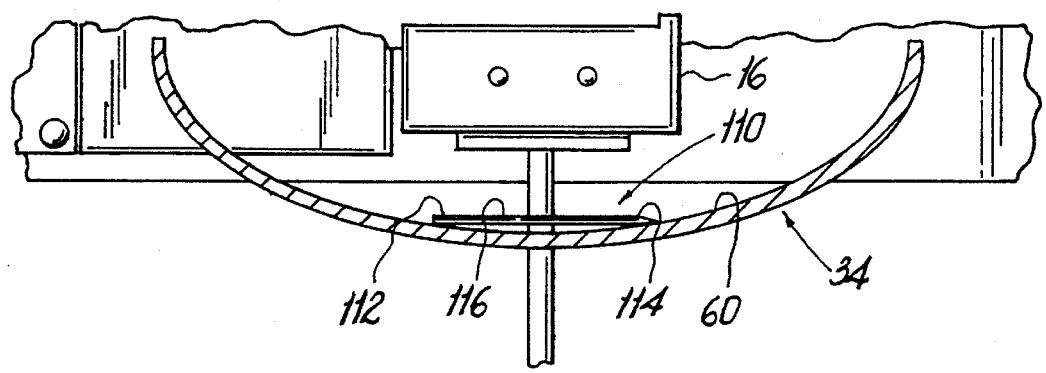
FIG. 4 is a cross-sectional view, taken along lines 4—4 of FIG. 3, of the rampway of the present invention illustrating an elongate member positioned thereon.

Referring now to FIGS. 1–4, in operation, a plurality of needle blanks, such as needle blank 110 shown in FIG. 4, are deposited onto base 26 of vibratory bowl 24. Referring for the moment specifically to FIG. 4, needle blank 110 is of the tapered variety and generally includes a barrel end 112, a center portion 116, and a tapered end portion 114 which has a diameter substantially less than that of barrel end 112. It will be noted that needle blanks 110 may be provided in various stages of completion, such as, for example, including drilled ends 112, fully or partially polished or unpolished center portions 116, and various degrees of taper in end portions 114.

Referring now to FIG. 2, needle blanks 110 deposited in base 26 of vibratory bowl 24 traverse bowl 24 and rail 28 in random orientation, i.e. either tapered end 114 or barrel end 112 first, until needle blanks 110 pass through adjusting block 30 and feed tube 32 such that needle blanks 110 exit outlet 33 singly, one at a time and are deposited in trough 54 of feeder block 16. While it is disclosed to provide needle blanks 110 to feeder block 16 by means of needle supply assembly 14, it is within the contemplated scope of the invention to use any suitable means or containers, such as cascade cartridges or even hand loading, to deposit tapered needle blanks into feeder block 16.

As noted above, feeder block 16 is particularly suited to receive a needle blank 110 and release needle blank 110 onto rampway 34 such that a longitudinal axis of needle blank 110 is substantially perpendicular to a longitudinal axis of ramp 34. Needle blanks 110 deposited into trough 54 flow through sinusoidal cascade channel 56 to fall freely towards textured surface 60 of rampway 34. Vibrator 50 gently shakes feeder block 16 to ensure a consistent and smooth flow of needle blanks through channel 56.

Figure 3:
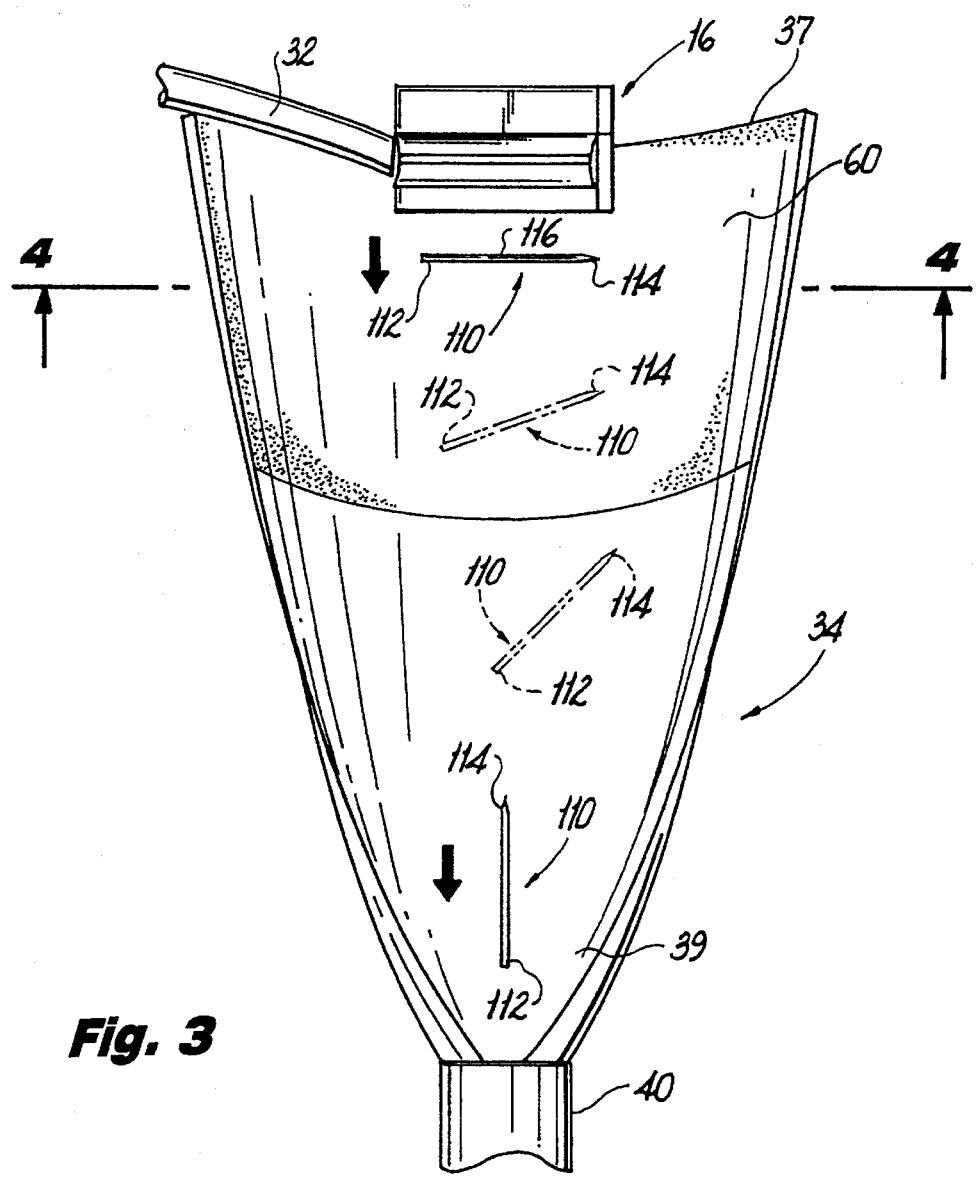
FIG. 3 is a top view of the rampway of the present invention illustrating an elongate member moving down the rampway.

Referring now to FIGS. 3 and 4, and initially to FIG. 4, it can be seen that as needle blank 110 is released onto concave rampway 34, needle blank 110 is supported on rampway 34 at barrel ends 112 and tapered point end 114. Center portion 116 is suspended above rampway 34.

As shown in FIGS. 1 and 2, inlet end 37 of rampway 34 is at a higher elevation than outlet end 39 of rampway 34 to allow needle blanks 110 to move down rampway 34. By adjusting the height of outlet end 39 by means of adjustable front support 38, the speed of the moving needle blank 110 can be controlled. Referring now to FIG. 3, inlet end 37 is preferably provided with a textured surface 60 on an inner surface thereof to ensure that barrel end 112 and tapered end portion 114 are rolled down rampway 34 rather than slide or slip. Once needle blank 110 has been released onto inlet end 37 of rampway 34 it begins to roll downwardly towards outlet end 39. As noted hereinabove, barrel end 112 and tapered end 114 contact rampway 34, while center portion 116 is suspended above rampway 34.

As further shown in FIGS. 3 and 4, barrel end 112 of needle blank 110 has a larger diameter and thus a larger circumference than the tapered end portion 114. As needle blank 110 rolls down tapered surface 60 on rampway 34, the larger circumference of barrel end 112 will, given consistent rotation of the needle blank, travel farther than tapered end portion 114 causing barrel end 112 to consistently advance ahead of end portion 114, thus needle blank 110 is caused to assume a barrel end 112 forward orientation on inlet end 37 of needle ramp 34. Additionally, a needle blank placed on a large radius or essentially flat rampway 34 will move such that the heavier or larger diameter barrel end 112 will slide or roll ahead of the lighter tapered end portion 114 thereby orienting the needle in a "barrel end downward" configuration on rampway 34.

It can be seen that any tapered needle blank 110 released on surface 60 of rampway 34 will consistently move such that barrel end 112 is oriented downward. While the needle blanks 110 shown and described in the accompanying figures in an initially tapered end point right orientation and it will be appreciated that both point right and point left orientations will move down rampway 34 such that larger diameter barrel end 112 will consistently end up ahead of tapered end portion 114.

As shown in FIGS. 2 and 3, once needle blank 110 rolls off textured surface 16, in a barrel end 112 down configuration, the needle blank 110 is allowed to slide the remainder of the way down rampway 34 towards funnel 42.

Funnel 42 collects the barrel end down needle blanks 110 and guides them into transfer tube 44 after which needle blanks 110 exit outlet 45 and fall into cascade cartridge 48. Once needle blanks 110 have been collected, in oriented fashion, within cascade cartridge 48, needle blanks 110 may be taken to additional stations for further needle processing such as, for example, drilling, flat pressing, side pressing, or curving, polishing or suture attachment and further finishing and refinement.

Figure 5:
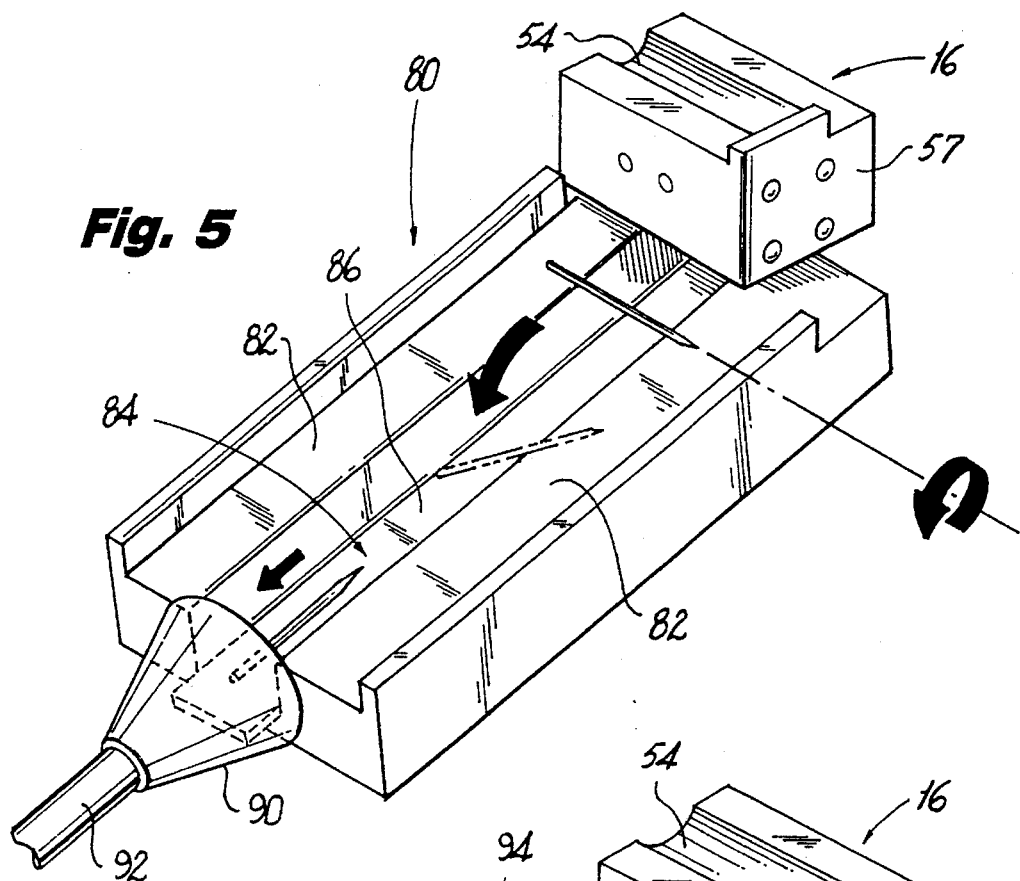
FIG. 5 is an alternate embodiment of the rampway for use with the elongate member orienting apparatus of the present invention.

Referring now to FIG. 5, there is shown an alternate rampway 80 for use with the needle orienting apparatus 10 of the present invention. Rampway 80 includes a pair of needle end supporting surfaces 82 which are adapted to support barrel end 112 and tapered end portion 114 of needle blank 110. Preferably, surfaces 82 are textured or otherwise friction enhanced as described hereinabove to encourage rolling of needle blank 110. A trough 84 is defined by needle end supporting surfaces 82 and is provided to suspend center portion 116. A slide 86 is formed between needle end supporting surfaces 82 and collects the oriented needle blanks 110 as they roll down needle end supporting surfaces 82.

Alternate rampway 80 is further provided with a needle blank transfer assembly including a funnel 90 and a discharge tube 92.

In operation, rampway 80 functions substantially similar to rampway 34 in that needles blanks 110, released perpendicular to a longitudinal axis of rampway 80 by means of feeder block 16, move down needle end supporting surfaces 82 on barrel ends 112 and tapered end portions 114. As described hereinabove, needle blank 110, having center portion 116 suspended above trough 84, will tend to move such that heavier, larger diameter barrel end 112 advances ahead of tapered end portion 114. As needle blanks 110 move down rampway 80, blanks 110 fall into trough 84 and slide towards funnel 90 along slide 86. Once needle blanks 110 enter funnel 90 in barrel end 112 orientation forward, needle blanks 110 pass through a tube 92 and can be collected by any suitable means, such as, for example, cascade cartridge 48.

Figure 6:
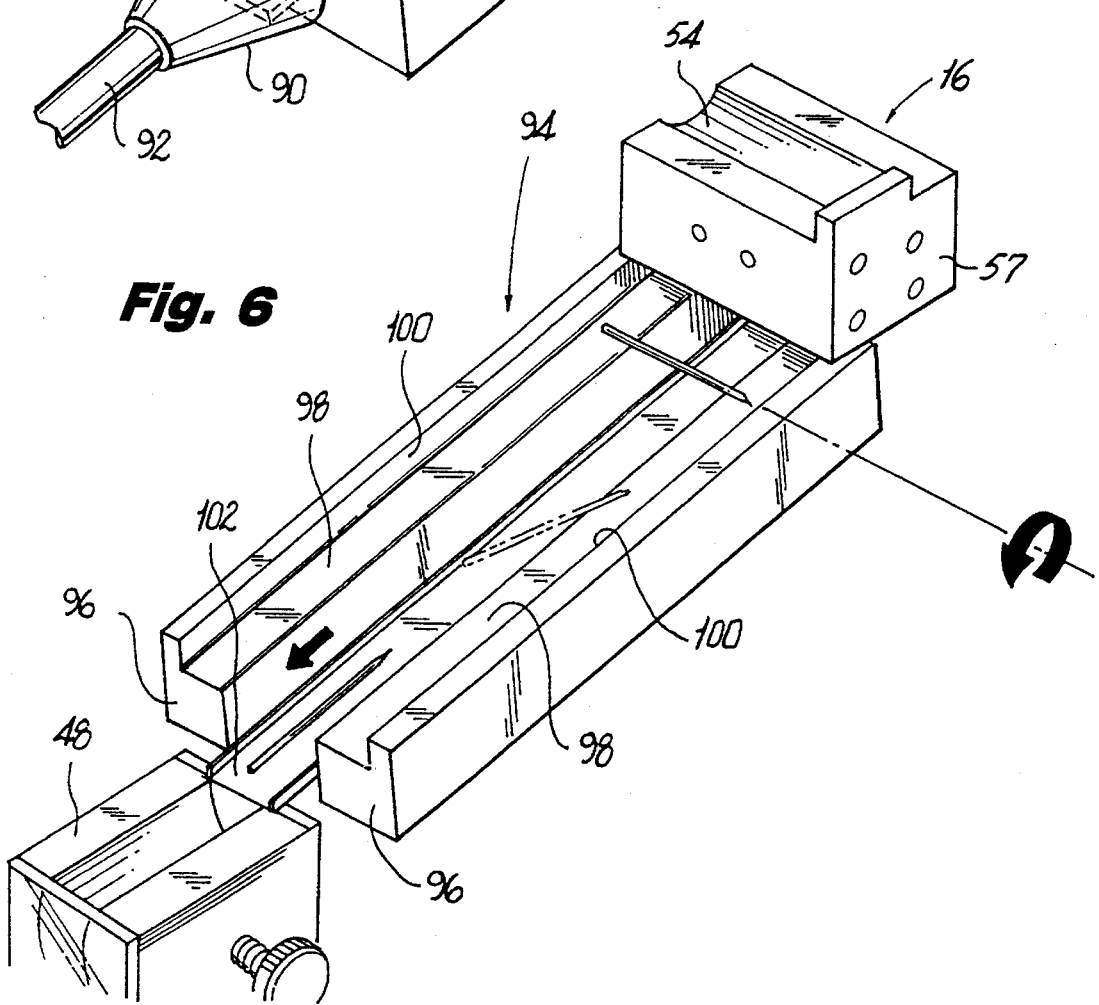
FIG. 6 is a further embodiment of the rampway for use with the elongate member orienting apparatus of the present invention.

Referring now to FIG. 6, there is disclosed a further alternate rampway 94 having a pair of needle supporting blocks 96. Needle supporting blocks 96 are provided with surfaces 98, which surfaces 98 may be textured as described with respect to surface 60 hereinabove, and walls 100 formed along blocks 96 to prevent needle blanks 110 from falling off the edges thereof. A slide tray 102 is positioned between blocks 96 to catch needle blanks 110.

In operation, needle blocks 110 are released by means of feeder block 16 onto surfaces 98 and move such that barrel ends 112 advance ahead of tapered end portions 114. Needle blanks 110 move off surfaces 98 and fall onto slide tray 102 which may be open at the end to deposit needle blanks into a cascade cartridge 48. Slide tray 102 may preferably be closed off at one end such that needle blanks 110 deposited thereon are collected at the lower elevation or outlet end of slide tray 110. Slide tray 102 is removable and can be used to transport the oriented needle blanks 110 to other processing stations.

It will be understood that various modifications can be made to the embodiments of the present invention herein disclosed without departing from the spirit and scope thereof. For example, various sizes of feeder blocks may be provided to accommodate various sized needle blanks is contemplated as well as various types of constructions materials which prevent marring of the needle blanks. Additionally, other various rampways are within the contemplated scope of the invention such that the rampway will support a barrel end portion and a tapered end portion wherein the barrel end portion has a greater diameter than the taper end portion and a center portion is suspended. Further, various structure for moving needle blanks along the rampways, such as, for example, supplying magnetic forces, air jets, or other supporting fluids sliding blocks or belts, etc., are within the contemplated scope of the invention. Also, various modifications may be made in the configuration of the various parts. Therefore, the above description should be not consumed as limiting the invention but merely as exemplifications of preferred embodiments thereof. Those skilled in the art will envision other modifications within the scope and spirit of the present invention as they are defined by the claims appended hereto.

What is claimed is:

1. An apparatus for orienting an elongate member, the elongate member having a first end with a diameter greater than the diameter of a second end, comprising:

a) a rampway having an elongate member orientating surface, the rampway being arcuate in cross-section and having an inlet end having a greater radius than art outlet end of the rampway;

b) releasing structure positioned adjacent the inlet end of the rampway for releasing at least one elongate member onto the rampway so that the elongate member is released substantially perpendicular to the length of the rampway, and the elongate member initially only contacts the rampway at its first and second ends, the frictional difference between the first and second ends relative to the rampway being, c) such that the first end of the elongate member at least partially moves ahead of the second end thereby causing the elongate member to assume a first end forward orientation on the rampway.

2. The apparatus according to claim 1, wherein a surface of the outlet end of the rampway is smooth to allow the elongate member to slide along the outlet end.

3. The apparatus according to claim 1, further comprising a resilient surface on at least a portion of the inlet end of the rampway to cushion the elongate member released thereonto by the depositing structure.

4. The apparatus according to claim 1, wherein the releasing structure includes a feeder block for discharging the elongate member onto the rampway.

5. The apparatus according to claim 4, wherein the feeder block is dimensioned and configured to sequentially discharge elongate members onto the rampway.

6. The apparatus according to claim 4, wherein the feeder block positions the longitudinal axis of the elongate member substantially perpendicular to the longitudinal axis of the rampway.

7. The apparatus according to claim 6, further comprising a vibratory bowl for holding a supply of elongate members and supplying a steady stream of elongate members to the feeder block.

8. The apparatus according to claim 1, wherein the moving mechanism includes structure for positioning the inlet end of the rampway at a higher elevation than the outlet end of the rampway.

9. The apparatus according to claim 8, wherein the moving mechanism includes structure to move the outlet end of the rampway in a vertical direction.

10. The apparatus according to claim 1, further comprising a container assembly at the outlet end of the rampway for collecting the oriented elongate members from the rampway.

11. The apparatus according to claim 10, wherein the container assembly includes:

a container for holding and maintaining the elongate member in its orientation; and b) a funneling device at the outlet end of the rampway for transferring a single oriented elongate member at a time from the rampway to the container.

12. The apparatus according to claim 10 further comprising a friction enhancing surface on at least a portion of the inlet end to encourage the first end of the elongate member to roll ahead of the second end of the elongate member.

13. The apparatus according to claim 10 further comprising a removable cascade cartridge positioned at the outlet end of the rampway and having a body portion and a sinusoidal channel therein for holding and maintaining the oriented elongate members.

14. A method of orienting a needle blank having a barrel end and a tapered point end comprising:
   a) providing a rampway having an elongate member orienting surface which is arcuate in cross-section, the rampway having an inlet end at a higher elevation than an outlet end of the rampway; and
   b) releasing the needle blank adjacent the inlet end of the rampway so that the elongate member is released substantially perpendicular to the length of the rampway, and the elongate member initially only contacts the rampway at its barrel end and tapered point end, the frictional difference between the barrel end and tapered point end relative to the rampway being such that the barrel end of the needle blank, being of a larger diameter than the tapered point end, moves ahead of the tapered point end to orient the needle blank in a barrel end downward configuration on the rampway.

15. The method according to claim 14, further comprising the step of transferring the barrel end down needle blank from the outlet end of the rampway to a container.

* * * * *